(12) United States Patent
Maccagni et al.

(10) Patent No.: US 10,533,238 B2
(45) Date of Patent: Jan. 14, 2020

(54) PROCESSES FOR RECOVERING NON-FERROUS METALS FROM SOLID MATRICES

(71) Applicant: Metals Technology Development Company LLC, Saint Louis, MO (US)

(72) Inventors: Massimo Giuseppe Maccagni, Sesto San Giovanni (IT); Jonathan Hylkjier Nielsen, Rolla, MO (US); William Leonard Lane, Viburnum, MO (US); David Michael Olkkonen, Viburnum, MO (US); Timothy Roy Hymer, Labadie, MO (US)

(73) Assignee: METALS TECHNOLOGY DEVELOPMENT COMPANY LLC, Saint Louis, MO (US)

( * ) Notice: Subject to any disclaimer, the term of this patent is extended or adjusted under 35 U.S.C. 154(b) by 0 days.

(21) Appl. No.: 15/897,553

(22) Filed: Feb. 15, 2018

(65) Prior Publication Data
US 2018/0171432 A1 Jun. 21, 2018

Related U.S. Application Data (63) Continuation of application No. 14/391,593, filed as application No. PCT/IB2013/052849 on Apr. 10, 2013, now Pat. No. 9,945,006.

(30) Foreign Application Priority Data

Apr. 11, 2012 (IT) .............................. MI2012A0579

(51) Int. Cl.
*C22B 7/00* (2006.01)
*C22B 3/46* (2006.01)
(Continued)

(52) U.S. Cl.
CPC ................ *C22B 7/008* (2013.01); *C22B 3/14* (2013.01); *C22B 3/44* (2013.01); *C22B 3/46* (2013.01);
(Continued)

(58) Field of Classification Search
CPC .. C22B 3/14; C22B 3/46; C22B 7/008; C22B 13/04; C22B 11/04; C22B 15/0078;
(Continued)

(56) References Cited

U.S. PATENT DOCUMENTS 3,743,501 A 7/1973 Cusanelli et al.
3,985,553 A 10/1976 Kunda et al.
(Continued)

FOREIGN PATENT DOCUMENTS

CL 1992000317 11/1992
CL 2011002998 8/2012
(Continued)

OTHER PUBLICATIONS

Senanayake, Gamini. "The role of ligands and oxidants in thiosulfate leaching of gold." Gold Bulletin. 38/4. pp. 170-179 (Year: 2005).*
(Continued)

Primary Examiner — Tima M. McGuthry-Banks
(74) Attorney, Agent, or Firm — MH2 Technology Law Group LLP (57) ABSTRACT

A process for recovering non-ferrous metals from a solid matrix may include: (a) leaching the solid matrix with an aqueous-based solution containing chloride ions, ammonium ions, and $Cu^{2+}$ ions, having a pH of 6.5-8.5, in a presence of oxygen, at a temperature of 100° C.-160° C. and a pressure of 150 kPa-800 kPa, so as to obtain an extraction solution comprising leached metals and solid leaching residue; (b) separating the solid leaching residue from the extraction solution; and/or (c) subjecting the extraction (Continued)

solution to at least one cementation so as to recover the leached metals in elemental state. The pH may be greater than or equal to 6.5 and less than or equal to 8.5. Temperature may be greater than or equal to 100° C. and less than or equal to 160° C. Pressure may be greater than or equal to 150 kPa and less than or equal to 800 kPa.

20 Claims, 2 Drawing Sheets

(51) Int. Cl.
- *C22B 15/00* (2006.01)
- *C22B 3/14* (2006.01)
- *C25C 1/00* (2006.01)
- *C22B 3/00* (2006.01)
- *C22B 3/44* (2006.01)

(52) U.S. Cl.
CPC .............. *C22B 11/04* (2013.01); *C22B 13/04* (2013.01); *C22B 15/0078* (2013.01); *C22B 15/0089* (2013.01); *C22B 19/24* (2013.01); *C22B 23/0446* (2013.01); *C22B 23/0469* (2013.01); *C25C 1/00* (2013.01); *Y02P 10/234* (2015.11)

(58) Field of Classification Search
CPC . C22B 15/0089; C22B 19/24; C22B 23/0446; C22B 23/0469
See application file for complete search history.

(56) References Cited

U.S. PATENT DOCUMENTS

| | | |
|---|---|---|
| 3,994,789 A | 11/1976 | Langer et al. |
| 5,308,381 A | 5/1994 | Han et al. |
| 5,328,669 A | 7/1994 | Han et al. |
| 5,542,957 A | 8/1996 | Han et al. |
| 5,650,057 A | 7/1997 | Jones |
| 5,788,844 A | 8/1998 | Olafson |
| 6,264,903 B1 | 7/2001 | Myerson et al. |
| 6,395,241 B1 | 5/2002 | Kinstle et al. |
| 7,465,334 B2 | 12/2008 | Moyes et al. |
| 9,945,006 B2 * | 4/2018 | Maccagni ................. C22B 3/14 |
| 2012/0103138 A1 | 5/2012 | Welham et al. |
| 2013/0336857 A1 | 12/2013 | Korzenski et al. |

FOREIGN PATENT DOCUMENTS

| | | |
|---|---|---|
| CL | 2013000500 | 9/2013 |
| CN | 1052265 C | 5/2000 |
| CN | 1571852 A | 1/2005 |
| EP | 0627503 A2 | 12/1994 |
| EP | 0704557 A1 | 4/1996 |
| GB | 1367945 A | 9/1974 |
| WO | 03/023077 A1 | 3/2003 |
| WO | 2007053947 A1 | 5/2007 |

OTHER PUBLICATIONS

International Search Report PCT/ISA/210 for International Application No. PCT/IB2013/052849 dated Jan. 24, 2014.
Written Opinion of the International Searching Authority PCT/ISA/237 for International Application No. PCT/IB2013/052849 dated Jan. 24, 2014.
Office Action for corresponding Chilean Patent Appl. No. 201402740 dated Oct. 4, 2016.
Chinese Office Action dated Jul. 27, 2015, issued in corresponding Chinese Appliation No. 201380025879.9 (with translation).
CN 1186523 A published Jul. 1998. Family list.
CN 1571852 A published Jan. 2005. Family list.

* cited by examiner

PROCESSES FOR RECOVERING NON-FERROUS METALS FROM SOLID MATRICES

CROSS-REFERENCE TO RELATED APPLICATION(S)

This application is a continuing application of U.S. patent application Ser. No. 14/391,593 ("the '593 application"), filed on Oct. 9, 2014, in the U.S. Patent and Trademark Office ("USPTO"), published as U.S. Patent Publication No. 2015/0114183 A1 on Apr. 30, 2015, and granted as U.S. Pat. No. 9,945,006 B2 on Apr. 17, 2018. The '593 application was a national stage entry from International Application No. PCT/IB2013/052849 ("the '849 application"), filed on Apr. 10, 2013, in the Receiving Office ("RO/IB") of the International Bureau of the World Intellectual Property Organization ("WIPO"), and published as International Publication No. WO 2013/153521 A2 on Oct. 17, 2013. The '849 application claims priority from Italian Patent Application No. MI2012A000579, filed on Apr. 11, 2012, in the Italian Patent and Trademark Office ("IPTO"). The entire contents of all of these applications are incorporated herein by reference.

The present invention relates to a process for recovering non-ferrous metals from a solid matrix.

In particular, the present invention relates to a process for recovering non-ferrous metals present in a solid matrix, such as a concentrated mineral (also called primary concentrate) or a residue of a hydrometallurgical extraction process of non-ferrous metals from concentrated minerals.

In nature, most non-ferrous metals are present in minerals in the oxidized state, in particular in the form of oxides, sulfides or carbonates.

Non-ferrous metals in the elemental state are produced starting from minerals through extraction processes of the pyrometallurgical or hydrometallurgical type, which are effected on the concentrated mineral.

The primary concentrate is the result of treatments effected on rocks extracted in mines in order to separate the mineral portion containing metal oxides from gangue (grinding, washing, granulometric selection, etc.).

The production of a non-ferrous metal by means of pyrometallurgical processes is generally influenced by the loss of various other metals, also in commercially significant quantities, which accumulate in the various by-products of the process or in its waste products (for example, dust from fume abatement and slag).

With respect to pyrometallurgical processes, hydrometallurgical processes are generally much more selective with respect to the metal to be produced. With the same primary concentrate treated, these processes therefore produce residues having higher concentrations of metals.

The residues of hydrometallurgical processes essentially consist of a matrix of inert material containing elemental sulfur and iron oxides, in addition to the metals not recovered in the main extraction process. Sulfur and iron oxides are elements which make it difficult to recover the non-ferrous metals present in the residues of primary extraction processes.

As the quantity of metals lost during the primary extraction process can be significant, their recovery by means of specific treatments of the residues is now consolidated praxis in the extractive metallurgical field. When this is possible, in fact, the recovery of these metals increases the overall profitability of the plants, limits the environmental impact of the production process and reduces the necessity for material and energy resources.

Various processes for the recovery of non-ferrous metals present in the residues of a hydrometallurgical extractive process are known and used in the state of the art.

These processes are generally based on the leaching of the residues with hydrochloric acid or sulfuric acid, followed by a recovery phase of the metals by means of precipitation. Alternatively, the leaching is followed by an extraction with a solvent of the desired metal and its subsequent separation from this by means of precipitation and/or electrolysis.

The recovery processes known in the art have various disadvantages.

A first disadvantage is linked to the fact that the residues deriving from the recovery process are often more problematical than the starting residues as the metallic values contained in these have proved to be inert to the previous treatment.

A second disadvantage lies in the complexity of these processes, which require a large number of different types of treatment (e.g. leaching, solvent extraction, precipitation/electrolysis).

A further disadvantage lies in the fact that the recovery processes are very often developed only for a certain type of residue coming from a certain type of extraction process. The known recovery processes are therefore not particularly flexible and cannot be used in different productive contexts.

A further disadvantage is linked to the fact that the recovery yield of the metals is greatly influenced by the presence of elemental sulfur and iron oxides.

An objective of the present invention is to overcome the drawbacks of the recovery processes known in the art.

Within this general objective, an objective of the present invention is to provide a process for recovering non-ferrous metals from residues of extractive processes which is effective, easy to effect, envisages a limited number of operative phases and in turn leads to the production of easily disposable residues.

A further objective of the present invention is to provide a process for recovering non-ferrous metals from residues of other extractive processes which can be applied to different types of residues, but also to primary concentrates.

These objectives according to the present invention are achieved by means of a process for recovering non-ferrous metals from a solid matrix as specified in claim 1.

Further characteristics of the process according to the present invention are envisaged in the dependent claims 2-13.

The characteristics and advantages of the process according to the present invention will appear more evident from the following illustrative and non-limiting description, referring to the enclosed schematic drawings, in which.

The process according to the present invention can be applied to the recovery of non-ferrous metals from solid matrixes, such as for example, residues of hydrometallurgical extraction processes of non-ferrous metals from concentrated minerals or by-products and waste-products of non-ferrous metals deriving from the same processes.

Unlike the processes known in the art, the process of the present invention can also be applied to the recovery of metals from primary concentrates.

In the present description, the term "non-ferrous metals" indicates elements of the periodic system classified as metals excluding iron, among which the most important are Ag, Cu, Pb, Ni and Co.

The process, object of the present invention, is preferably advantageously used for recovering, among others, the following non-ferrous metals from solid matrixes: Ag, Cu, Pb, Ni and Co.

The solid matrix is subjected to the recovery process in powder form. For this purpose, if necessary, it can be previously subjected to grinding and/or granulometric selection.

The process according to the present invention comprises at least one leaching phase (a) of the solid matrix containing non-ferrous metals to be recovered following by at least one cementation phase (b) of the metals through which the metals of interest are separated in the elemental state.

The leaching is effected with an aqueous-based leaching solution containing chloride ions and ammonium ions, prepared, for example, by dissolving, in water, chlorides of alkaline and/or alkaline-earth metals together with ammonium chloride.

The concentration of chloride ions varies within the range of 50-250 g/l; the concentration of ammonium ions varies within the range of 20-150 g/l.

The pH of the solution is neutral, i.e. within the range of 6.5-8.5.

The leaching is effected under heat, at a temperature varying within the range of 100° C.-160° C., and a pressure varying within the range of 150 kPa-800 kPa.

The duration of the leaching phase varies according to the nature of the solid matrix and the content of metals to be recovered. The leaching typically lasts from one to ten hours.

Leaching under the above operative conditions envisages the passage in solution of the non-ferrous metals present in the solid matrix and at the same time, the oxidation of the metallic sulfides possibly present. The final pH of the solution can decrease to values lower than 1 in relation to the composition of the feeding to the reactor and the operative conditions.

The dissolution reaction of the metallic sulfides is held to be the following:

$$Me_2S_n+2nNH_4Cl+n/2O_2 \rightarrow 2Me(NH_3)_mCl_n+nH_2O+nS \quad (1),$$

in which, when Me=Ag, Cu, Pb, Ni, Co and Zn, then n=1 or 2, m=0 or 2.

The dissolution reaction of the metallic oxides is held to be the following:

$$Me_2O_m+mNH_4Cl \rightarrow 2Me(NH_3)_mCl_m+mH_2O \quad (2),$$

in which, when Me=Ag, Cu, Pb, Ni, Co and Zn, then m=1 or 2.

The leaching solution can advantageously contain $Cu^{2+}$ ions, introduced, for example, by adding a copper salt such as $CuCl_2$. It is believed that the copper ions substantially act as catalyst, favouring the dissolution reaction of the metallic oxides. These ions, in fact, oxidize the sulfides present, reducing in turn the $Cu^+$ ions; the $Cu^+$ ions are then oxidized again to $Cu^{2+}$ by the oxygen present in the reaction environment.

It is held that the following reactions are at the basis of this catalytic effect of the $Cu^{2+}$ ions:

$$Me_2S_n+2nNH_4Cl+2nCuCl_2 \rightarrow 2Me(NH_3)_mCl_n+2nCuCl+2nHCl+nS \quad (3)$$

$$2nCuCl+2nHCl+n/2O_2 \rightarrow 2nCuCl_2+nH_2O \quad (4)$$

The sum of reactions (3) and (4) leads to the overall reaction (1).

Under the process conditions described above, the leaching solution comprising chloride ions and ammonium ions, is capable of effectively dissolving the non-ferrous metals of interest, avoiding the addition of sulfuric acid and/or sulfates in the leaching solution. The addition of sulfuric acid and sulfate ions is in fact undesired, as, at the end of the extraction process, they should be eliminated from the leaching solution (for example, by precipitation in the form of calcium sulfate) with a consequent increase in energy costs, consumption of chemical reagents and production of waste-products to be disposed of.

At the end of the leaching phase (a), a solution is obtained, containing ions of the non-ferrous metals leached from the solid matrix (extraction solution) and a solid leaching residue consisting of the part of the solid matrix which has not dissolved.

After separating the solid leaching residue, the leached metals present in the extraction solution are separated from this by means of precipitation. The metals are thus recovered in the elemental state.

The precipitation of the metals is effected by means of cementation (also known as "chemical displacement precipitation"). Cementation is the reaction through which a first metal is precipitated in the elemental state, from a solution containing it in dissolved form, by the addition to the solution of a second metal in the elemental state (precipitating metal) having a lower (or more negative) reduction potential with respect to the reduction potential of the first metal.

The cementation phase allows the leached metals present in the extraction solution to selectively precipitate, suitably selecting the precipitating metal on the basis of its reduction potential. Moreover, the selectivity of the separation depends on the concentration ratios between each of the leached metals, therefore the selectivity of the precipitation of the metals could result in being much less effective.

The cementation, therefore, can be carried out in such a way that a single leached metal, or a predetermined combination of metals, precipitates at a time, mainly depending on the difference between their reduction potential and that of the precipitating metal, in addition to the concentration of the respective ions in the solution subjected to cementation.

The precipitation of a non ferrous metal by cementation is therefore to be meant as the precipitation of a cement prevalently containing a predetermined non ferrous metal or a predetermined combination of non ferrous metals.

Typically, when the cementation is selective with respect to a single metal or combination of metals, the cement contains the metal or the combination of metal in a highly pure form (higher than 95% by weight with respect to the weight of the cement; the remaining part consists of impurities of other metals in the elemental state).

According to a preferred embodiment, the cementation comprises a first step in which a combination of silver and copper is prevalently precipitated, and a second step in which a combination of lead, nickel and cobalt is prevalently precipitated.

The cements obtained with the process of the present invention can be re-used as such or they can be subjected to simple known purification processes, so as to obtain metals having an even higher purity.

As the starting solid matrix contains more than one non-ferrous metal to be recovered, the cementation is preferably effected in a plurality of steps in series (multistep cementation), in each of which one or more of the leached metals precipitates.

In each step, the precipitating metal is added to the solution subjected to cementation in powder form, thus favouring the chemical displacement reaction which leads to the precipitation of the metallic cement.

The precipitating metal is generally added in an excess quantity with respect to that of the metal to be precipitated.

Although in each step a different precipitating metal can be added, in a preferred embodiment, the metal added in each of the cementation steps is always the same.

In this preferred embodiment of the process of the present invention, the cementation is effected as follows.

In a first cementation step, a first quantity of precipitating metal is added to the extraction solution, obtaining the precipitation of the non-ferrous metal having the highest reduction potential among the metals present in solution.

The precipitating metal is added to the solution in an excess quantity with respect to the metal to be precipitated, so as to guarantee the complete precipitation of the metal to be recovered. The excess precipitating metal is calculated in relation to the specific chemical displacement reaction which takes place in the cementation step. The precipitating metal is typically added in an excess of 1 to 30% with respect to the stoichiometric quantity with respect to the metal to be precipitated.

The extraction solution is left to decant and the precipitated metal, in the elemental state, is subsequently separated from the supernatant solution by filtration.

The supernatant solution containing the remaining leached metals, possibly in addition to a residual quantity of ions of the first precipitated metal, is subjected to a second cementation step, wherein, by the addition of a second quantity of precipitating metal, the precipitation is caused of the non-ferrous metal having the highest reduction potential among the remaining metals present in the solution.

Due to the favourable reduction potential of the first metal, the precipitation of the second metal is accompanied by the possible precipitation of a further quantity of the first metal.

After separating the cement of the second metal, the supernatant solution is subjected to a third cementation step, in which a further non-ferrous metal is precipitated (the one having the highest reduction potential among those still in solution) by effecting the same operations as the previous cementation steps. The precipitation of the cement of the third metal will be accompanied by the possible precipitation of increasingly less significant quantities of the previous metals precipitated.

After the precipitation of the third metallic cement, the supernatant solution is subjected to possible further cementation steps, analogously to the previous steps, until all the non-ferrous metals of interest present in the extraction solution have precipitated and been recovered.

As already specified, in each cementation step, the metal used as precipitating metal can be any metal having a reduction potential lower than the reduction potential of at least one of the leached metals present in solution. In all the cementation steps, the same precipitating metal is preferably used. In this case, the precipitating metal must have a lower reduction potential with respect to the reduction potential of each of the leached metals present in solution.

A metal particularly suitable for the purpose is zinc, due to its low cost and greater tendency to oxidize with respect to the non-ferrous metals typically to be recovered. The standard reduction potential of zinc for the pair $Zn^{2+}/Zn$ is in fact equal to $-0.76$ V.

At the end of the last cementation step, after recovering all the leached non-ferrous metals, the supernatant solution substantially only contains the ions of the metal used as precipitant in the various cementation steps (in addition to possible residues of ions of non-precipitated leached metals). The supernatant solution can be advantageously subjected to electrolysis to recover the precipitating metal in elemental form, so that it can be re-used in subsequent recovery process cycles.

In a preferred embodiment, the electrolysis of the final extraction solution is effected in an open cell, with a titanium cathode and graphite anode, according to the process described in patents EP 627503 B1 and 704557 B1.

The particular composition of the electrolytic solution, which contains $Cl^-$ and $NH_4^+$ ions, allows the electrodeposition of metallic zinc to be obtained at the cathode and the evolution of gaseous chlorine at the anode. As it is formed, the gaseous chlorine reacts rapidly with the ammonium ions present in solution around the anode forming ammonium chloride with evolution of gaseous nitrogen.

The possible electrolysis of the final extraction solution not only allows the recovery of the metallic zinc, but also the regeneration of the leaching solution, which can be re-used in phase (a) of the process.

The reactions involved in the electrolysis process are the following:

at the anode:

$$Zn(NH_3)_2Cl_2+2e^- \rightarrow Zn+2NH_3+2Cl^- \quad (5),$$

at the cathode:

$$2Cl^- \rightarrow Cl_2+2e^- \quad (6),$$

close to the cathode:

$$Cl_2+\tfrac{2}{3}NH_3 \rightarrow \tfrac{1}{3}N_2+2HCl \quad (7)$$

The overall chemical reaction of the electrolytic cell is:

$$Zn(NH_3)_2Cl_2+\tfrac{2}{3}NH_3 \rightarrow Zn+\tfrac{1}{3}N_2+2NH_4Cl \quad (8)$$

The electrolytic process described above is particularly advantageous as it avoids the evolution of gaseous chlorine, which is a toxic gas, in favour of the evolution of gaseous nitrogen.

The zinc electrodeposited on the titanium cathode is finally recovered, for example, in the form of a metallic sheet which can be then melted into ingots. Pure zinc powder can be produced from the molten mass. The zinc powder thus recovered can be re-used in new recovery process cycles of non-ferrous metals according to the present invention.

Figure 1:
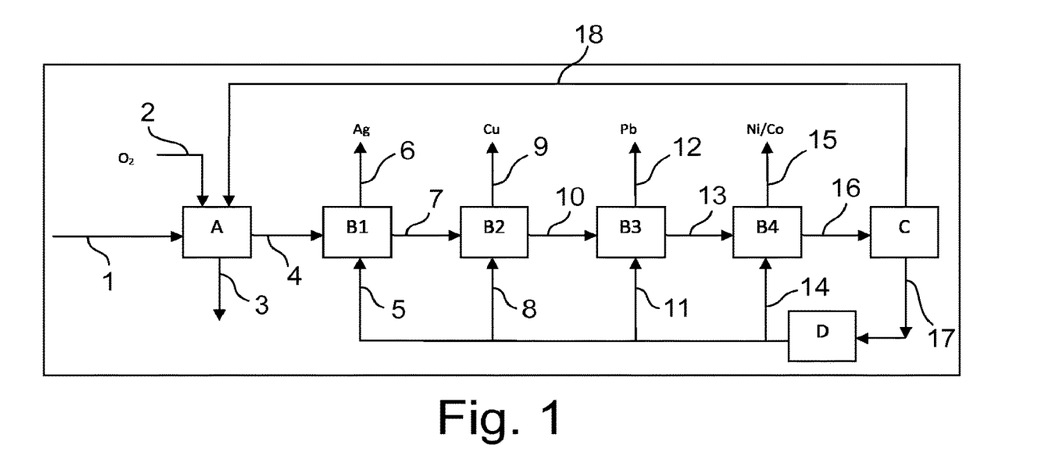
FIG. 1 is a schematic block representation of a first embodiment of the process of the present invention.

FIG. 1 schematically illustrates a possible sequence of phases of the process of the present invention in which the same precipitating metal is used in all the cementation steps.

In FIG. 1, the block A represents the leaching phase to which a solid matrix 1 (in powder form) containing the non-ferrous metals Ag, Cu, Pb, Ni and Co to be recovered, is subjected.

The leaching is carried out in the presence of a stream of oxygen 2 so as to obtain the oxidation of the sulfides possibly present in the solid matrix. The leaching can be effected inside a heated reactor capable of resisting the operating pressures previously indicated.

At the end of the leaching, the solid residue 3 and extraction solution 4 containing the non-ferrous metals to be recovered, are separated from the reactor.

The extraction solution 4 is fed to a first cementation step B1, where, by adding zinc powder 5 (precipitating metal), the precipitation of silver (standard reduction potential Ag$^+$/Ag=+0.81 V) is obtained, according to the reaction $$Ag(NH_3)_2Cl + Zn \rightarrow Ag + Zn(NH_3)_2Cl \qquad (9)$$

Once the silver has been separated (stream 6), the remaining supernatant solution 7 containing the remaining non-ferrous metals to be recovered is fed to a second cementation step B2, where, by the addition of a further quantity of zinc 8, copper (stream 9) precipitates (standard reduction potential Cu$^{2+}$/Cu=+0.34 V) according to the reaction $$Cu(NH_3)_2Cl_2 + Zn \rightarrow Cu + Zn(NH_3)_2Cl_2 \qquad (10)$$

In a subsequent cementation step B3, the supernatant solution 10 obtained in the second cementation step B2 is subjected to a further cementation by the addition of a further quantity of metallic zinc 11. This addition causes the precipitation of lead (stream 12) (standard reduction potential Pb$^{2+}$/Pb=−0.13 V) according to the reaction $$PbCl_2 + Zn \rightarrow Pb + ZnCl_2 \qquad (11).$$

The precipitated lead is separated (stream 10), whereas the supernatant solution 13 is fed to the subsequent cementation step B4. In this latter step, the addition of zinc 14 causes the contemporaneous precipitation of nickel (standard reduction potential Ni$^{2+}$/Ni=−0.23 V) and cobalt (standard reduction potential Co$^{2+}$/Co=−0.28 V), as these two metals have reduction potentials very close to each other.

The precipitation reactions of nickel and cobalt are the following:

$$Ni(NH_3)_2Cl_2 + Zn \rightarrow Ni + Zn(NH_3)_2Cl_2 \qquad (12)$$

$$Co(NH_3)_2Cl_2 + Zn \rightarrow Co + Zn(NH_3)_2Cl_2 \qquad (13)$$

Figure 2:
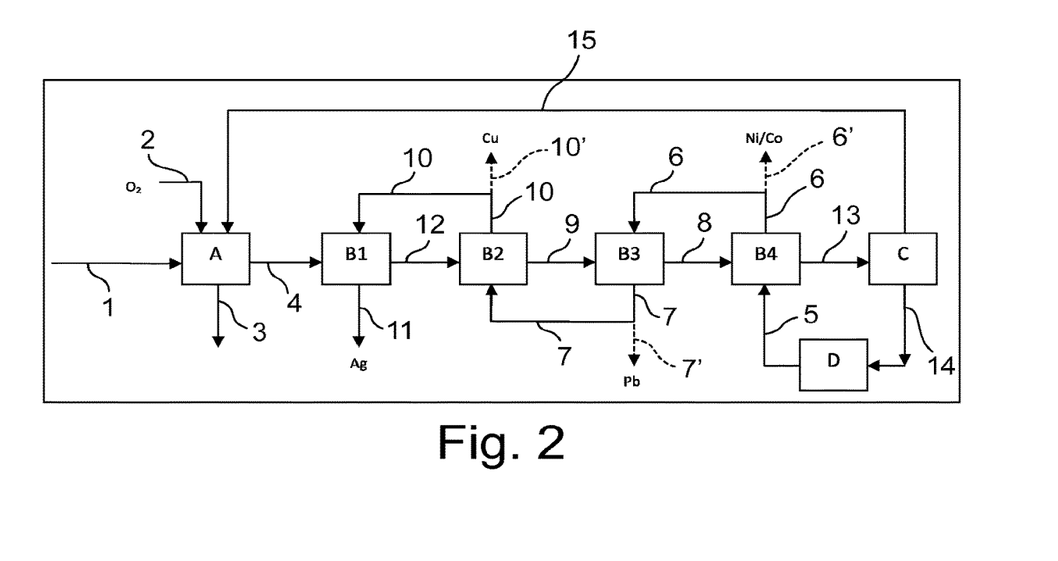
FIG. 2 is a schematic block representation of a second embodiment of the process of the present invention.

Nickel and cobalt are then separated in the form of a single cement represented in FIG. 2 by the stream 15.

The supernatant solution 16 obtained in the cementation step B4 is fed to a subsequent electrolysis phase (block C) for the recovery of the zinc present in solution. The zinc in solution comprises Zn$^{2+}$ ions deriving from the initial leaching of the solid matrix and those progressively added as precipitating metal in the cementation steps B1-B4.

The zinc is recovered by means of electrolysis, by electrodeposition at the cathode. The electrodeposited zinc 17 is then fed to the subsequent melting phase (block D) in which the metallic zinc is recovered in ingot form. Zinc powder can also be produced from the melting phase, so that it can be re-used in the various cementation steps B1-B4.

In addition to the deposition of zinc, the electrolytic process produces a regenerated electrolytic solution 18 having a chemical composition which is substantially identical to that of the leaching solution (in which a residual concentration of Zn$^{2+}$ ions not deposited at the cathode, remains). The regenerated electrolytic solution 18 is then recycled to the leaching phase (a).

According to a second embodiment of the process of the present invention, in each cementation step, the precipitating metal at least partially consists of the metallic cement obtained in a subsequent cementation step.

In this embodiment, each cementation step therefore uses a different precipitating metal.

According to this embodiment, with reference to FIG. 2, a solid matrix 1 containing non-ferrous metals Ag, Cu, Pb, Ni, Co and a stream of oxygen 2 are fed to the leaching phase (block A) to obtain the contemporaneous oxidation of the sulfides possibly present in the solid matrix.

The solid leaching residue 3 and extraction solution 4 containing the above non-ferrous metals dissolved, are separated from the leaching phase.

The extraction solution 4 is then subjected to a multistep cementation, in which the number of steps in series corresponds to the number of different metals (or groups of metals, in the case, for example, of the pair Ni and Co) to be recovered.

In the case represented in FIG. 2, the extraction solution 4 is subjected to four consecutive cementation steps (steps B1-B4).

When the recovery process is under regime conditions, in the first cementation step B1, the precipitating metal added to the extraction solution is the cement containing metallic copper 10 obtained in the subsequent cementation step B2.

The addition of the copper cement 10 induces the reduction of the silver ions and consequent precipitation of Ag in the elemental state (stream 11); contemporaneously, the metallic copper added, oxidizes and returns in solution in the form of Cu$^{2+}$ ions.

The silver cement 11 precipitated in step B2 is then separated by decanting and/or filtration from the supernatant solution (stream 12). The latter is fed to the subsequent step B2, where it is subjected to further cementation.

In step B2, the cementation is effected by adding the lead cement 7 obtained from the subsequent cementation step B3. The precipitation of the copper cement 10 in step B2 is accompanied by the contemporaneous dissolution of the lead cement 7 added as precipitating metal, which thus returns in solution in the form of Pb$^{2+}$ ions. Copper is substantially the only metal which precipitates in this step, as silver—the only metal in solution which has a more favourable reduction potential—is substantially absent, as it was recovered in the previous step B1. In the copper cement, therefore, the other metals (including silver) are possibly present in negligent quantities. The supernatant solution 9 obtained from the separation of the copper cement 10 in step B2 is fed to the subsequent cementation step B3, where it is subjected to further cementation.

In step B3, the precipitation is caused of the lead cement 7, by adding the Ni/Co cement 6 obtained in the subsequent cementation step B4. The precipitation of the lead cement is accompanied by the dissolution of the Ni/Co cement added as precipitating metal, which thus returns in solution in the form of Ni$^{2+}$ and Co$^{2+}$ ions.

Analogously to what takes place in step B2, in step B3, lead is substantially the only metal which precipitates, as silver and copper are substantially absent, as these two metals were recovered in the previous steps B1 and B2.

The supernatant solution 8, obtained in step B3 after separating the lead cement 7, is fed to the subsequent and last step B4, where it is subjected to further cementation. In this step, as the cement of a metal having a lower reduction potential with respect to the potentials of Ni and Co is not available, the precipitating metal is a metal added externally (i.e. not coming directly from another cementation step of the process). In the process illustrated in FIG. 2, the precipitating metal is zinc in powder form.

Analogously to what takes place in steps B2 and B3, in step B4, nickel and cobalt are substantially the only metals which precipitate, as silver, copper and lead are substantially absent in the solution treated in this step, as they have been recovered by the respective solution in which they were dissolved in the previous steps B1-B3.

Under regime conditions, the process described above continues until the first silver cement (stream 11) is separated from the solution treated in step B1 and removed from the process. In the absence of silver, in step B2, it is therefore possible to quantitatively separate the copper cement, which is definitively removed in turn from the process (stream 10').

The recovery of the remaining metals continues in the same way with the separation of the lead cement in B3 (stream 7') and subsequently the Ni/Co cement (stream 6').

In order to reach regime conditions, the process can be actuated by introducing into the solutions treated in the cementation steps B1-B3, a quantity of precipitating metal not recycled directly from a cementation step of the recovery process (in B1, metallic copper is added; in B2, metallic lead is added; in B3, metallic Ni and Co are added). The contemporaneous addition of these first quantities of precipitating metal allows a first quantity of cement to be obtained in each step, to be recycled to the respective previous cementation step.

As the process proceeds, the metallic cement produced in each step is precipitated in a sufficient quantity for sustaining the process without any further external addition of metal.

When the recovery of non-ferrous metals has been completed, the supernatant solution leaving step B4, which at this point prevalently contains $Zn^{2+}$ ions, is subjected to electrolysis (block C) to recover the metallic zinc as in the case of the process illustrated in FIG. 1.

The zinc recovered by electrodeposition at the cathode (stream 14) is then fed to the subsequent melting phase (block D) where it is recovered in the form of ingots. Metallic powder can be produced from the melting phase, which can be advantageously recycled as precipitating metal in the last cementation step B4.

After the electrodeposition of zinc, the regenerated electrolytic solution, containing chloride and ammonium ions, is fed to the leaching phase (a) (stream 15).

As previously mentioned, in each cementation step, the precipitating metal is preferably added in an excess quantity with respect to the quantity of metal to be precipitated present in solution, in order to guarantee a complete precipitation of the latter.

The Applicant has observed, however, that when the cementation is effected in a single phase, i.e. by means of a single addition of precipitating metal in excess as previously described, the cementation reaction leads to a precipitate which can contain high quantities of impurities. In order to obtain significant recovery yields in a single precipitation phase, it is in fact necessary to add a strong excess of precipitating metal to the extraction solution, with the consequence that the non-reacted precipitating metal can remain in the metallic cement, thus polluting the final product.

This difficulty can be overcome by preferably effecting the single cementation step in two or more consecutive phases (multiphase cementation step).

Figure 3:
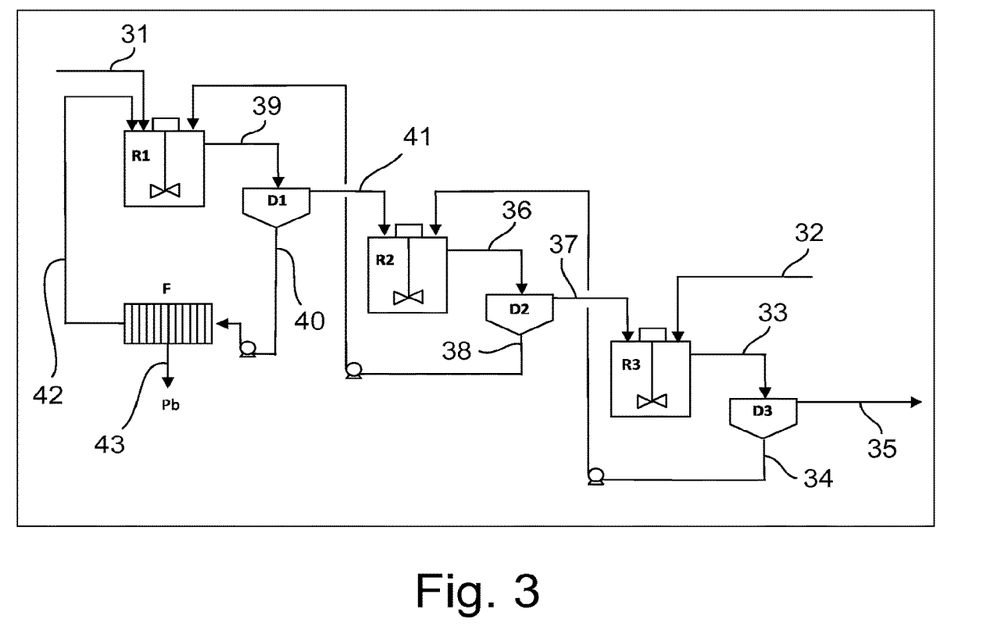
FIG. 3 is a schematic block representation of a preferred embodiment of a single cementation step of the process represented in FIGS. 1 and 2.

With reference to FIG. 3, a multiphase cementation step consisting of 3 precipitation phases is described hereunder.

The multiphase cementation step of FIG. 3 is effected by dividing the solution containing the metals 31 (which can be the extraction solution obtained in the leaching phase or a supernatant solution coming from a previous cementation step), into at least two aliquots, positioned in different precipitation reactors. In the case illustrated in FIG. 3, the solution is divided into three aliquots distributed in the reactors R1-R3.

In the first cementation step, an excess of precipitating metal 32 is added to the first aliquot of the solution to be treated present in the reactor R3, so as to obtain the complete precipitation of the leached metal with the highest reduction potential value among those present, whose concentration had already been reduced in the previous phases.

The solution containing the metallic cement 33 is transferred into a decanter D3, where the metallic cement 34, which contains the precipitated metal and excess of non-reacted precipitating metal, is separated from the supernatant solution 35. The supernatant solution 35 deriving from the separation of the cement 34 of the first metal is fed to a subsequent cementation step, whereas the cement 34 of the first metal is joined to the solution fed into the second reactor R2. If the multiphase step is the last cementation step of the recovery process, the supernatant solution 35 is fed to the subsequent electrolysis phase for the recovery of the precipitating metal.

In the reactor R2, the excess of precipitating metal which did not react in the previous phase effected in the reactor R3, causes the precipitation of a second quantity of the same metal. The solution containing the precipitated metal 36 is transferred to a decanter D2, where the cement 38 is separated from the supernatant solution 37.

The cement 38, which contains the second quantity of precipitated metal together with the first quantity of the same metal recovered in the previous cementation phase and the excess of precipitating metal, is sent to a third cementation phase effected in the reactor R1, whereas the supernatant solution 37 is fed to the previous cementation phase in the reactor R3.

In the reactor R1, the excess of precipitating metal contained in the cement 38 coming from the reactor R2, causes the precipitation of a third quantity of the same metal. Analogously to the previous phases, the solution 39 containing the precipitated cement containing the overall metal precipitated in the three reactors R1-R3 is transferred to the decanter D1, where the final cement 40 is separated from the corresponding supernatant solution 41. The final cement 40, if definitively recovered from the process, is filtered in the filter F to separate it from the residual fraction of supernatant solution 42, which is recycled to the reactor R1. Alternatively, the final cement 40 can be recycled in a previous cementation step as precipitating metal (recycling not represented in FIG. 3).

The process, object of the present invention, not only guarantees an effective recovery of the non-ferrous metals from solid matrixes, such as residues of hydrometallurgical extraction processes of non-ferrous metals from primary concentrates, but is also an extremely versatile process which can be advantageously applied to the same primary concentrates of minerals containing non-ferrous metals.

Unlike the processes known in the art, moreover, the process, object of the present invention, can be integrated without any difficulty into other metallurgical extraction productive cycles, regardless of the type of metal extracted in the primary production cycle, allowing the overall production yield of the extraction process to be increased.

Furthermore, the process, object of the present invention, is easy to effect and envisages a reduced consumption of raw materials with respect to processes known in the state of the art, as most of these can be recycled to the process itself, in addition to a significant reduction in the quantity of residues produced.

By envisaging a leaching phase in the presence of oxygen, the process, object of the present invention, is also effective in the extraction of non-ferrous metals from solid matrixes also containing significant quantities of metallic sulfides or iron oxides.

The following embodiment examples are provided for purely illustrative purposes of the present invention and should not be considered as limiting the protection scope defined by the enclosed claims.

EXAMPLES 1 kg of a residue deriving from a hydrometallurgical treatment of a lead concentrate was subjected to the process according to the present invention, as described hereunder.

The residue had the following content of metals (weight percentages):

Fe 12.7%,
Pb 6.3%,
Zn 5.2%,
Cu 4.8%,
Ni 0.32%,
Co 0.27%,
Ag 0.015%,
Elemental S 51.5%.

The residue in powder form was subjected to leaching in the presence of oxygen, at a pressure of 350 kPa and 120° C. for 2 hours, using 20 l of a leaching solution containing 200 g/l of $NH_4Cl$, 100 g/l of NaCl and 12.23 g/l of zinc ($Zn^{2+}$).

The zinc ions present in the leaching solution derive from the recycling of the regenerated electrolytic solution, after the electrodeposition of metallic zinc, from a previous recovery cycle.

At the end of the leaching, the extraction solution has the following content of metallic ions:

$Zn^{2+}$ 14.60 g/l,
$Pb^{2+}$ 2.95 g/l,
$Cu^{2+}$ 2.30 g/l,
$Ni^{2+}$ 0.14 g/l,
$Co^{2+}$ 0.12 g/l,
$Ag^{+}$ 0.007 g/l 0.05 g of zinc powder were added to the extraction solution to precipitate a cement prevalently containing metallic silver. The cementation of the silver was effected in two consecutive phases. 0.150 g of silver cement containing 2.78% by weight of metallic zinc are obtained from this cementation step. The concentration of $Ag^+$ ions remaining in the supernatant solution proved to be less than 0.1 mg/l.

After separation of the silver cement, the remaining supernatant solution was subjected to a second cementation step to precipitate a copper cement. As in the previous case, the cementation was carried out in two phases by the addition of 48.0 g of zinc powder, obtaining 46.6 g of copper cement containing 1.27% by weight of zinc. The residual content of copper ions in the extraction solution is less than 2 mg/l.

After separation of the copper cement, the remaining supernatant solution was subjected to a third cementation step to precipitate a lead cement, again in two consecutive phases. The precipitation of the lead cement was induced by adding 20.0 g of zinc powder, obtaining 59.0 g of lead cement containing 2.12% by weight of zinc. The final lead in solution is less than 2 mg/l.

After separation of the lead cement, the remaining supernatant solution was finally subjected to a fourth cementation step to precipitate the nickel and cobalt. The cementation was carried out in three phases, by adding 5.8 g of zinc powder and obtaining 5.2 g of cement containing 52.9% of nickel, 43.1% of cobalt and 4.0% of zinc. The residual content of nickel and cobalt ions in the extraction solution is Ni=1.4 mg/l and Co=2.3 mg/l, respectively.

At the end of the last cementation, the concentrations of the other non-ferrous metals initially present in the extraction solution are further reduced in the meantime, whereas the final concentration of the zinc ions proved to be 21.9 g/l.

The extraction solution was then subjected to electrolysis, at 80° C. and 300 $A/m^2$, for the recovery of the zinc in an open cell with a titanium cathode and a graphite anode, obtaining the deposition of 191 g of material on the cathode.

The composition of the material deposited at the cathode was the following:

Pb 12 ppm,
Cu 20 ppm,
Ni 10 ppm,
Co 8 ppm,
Ag <1 ppm, from which it derives, by difference, that the remaining zinc has a purity higher than 99.99%.

The analytical data of the cementation described above are indicated in Table 1 below.

TABLE 1

| | Ag | Cu | Pb | Ni/Co | Zn |
|---|---|---|---|---|---|
| Conc. in extraction solution (g/l) | 0.007 | 2.30 | 2.95 | Ni = 0.14 Co = 0.12 | 14.60 |
| Residual Me ions in supernatant solution (g/l) | <0.001 | <0.002 | <0.002 | Ni = 0.0014; Co = 0.0023 | 21.9[4] |
| Amount of cement recovered (g) | 0.150 | 46.6 | 59.0 | 5.2 | — |
| Zn in cement (% weight[1,3]) | 2.78 | 1.27 | 2.12 | 4.0 | 191[5] |
| Cementation step | I (2[2]) | II(2[2]) | III(2[2]) | IV(3[2]) | (electrolysis) |
| Metallic Zn added (g) | 0.05 | 48.0 | 20.0 | 5.8 | — |

[1]Weight percentage referring to the weight of cement recovered
[2]Number of phases
[3]Content of Ni and Co in the cement: 52.9% Ni; 43.1% Co
[4]Content of $Zn^{2+}$ ions measured in the solution subjected to electrolysis
[5]Amount of metallic Zn deposited at the cathode during electrolysis.

Example 2

1 kg of the same residue treated in Example 1 was subjected to leaching under the same conditions indicated in Example 1, using, however, 25 l of a leaching solution containing 200 g/l of $NH_4Cl$, 100 g/l of NaCl, 1 g/l of $Cu^{2+}$ ion and 12.23 g/l of zinc.

The cementation and subsequent electrolysis of the final extraction solution was carried out according to the same steps indicated in Example 1. The relative analytical data are indicated in Table 2 below.

TABLE 2

| | Ag | Cu | Pb | Ni/Co | Zn |
|---|---|---|---|---|---|
| Conc. in extraction solution (g/l) | 0.006 | 2.86 | 2.41 | Ni = 0.12 Co = 0.10 | 14.21 |
| Residual Me ions In supernatant solution (g/l) | <0.001 | <0.003 | <0.004 | Ni = 0.0019; Co = 0.0016 | 22.2[4] |
| Amount of cement recovered (g) | 0.153 | 72.0 | 61.3 | 5.2 | — |
| Zn in cement (% weight[1,3]) | 2.02 | 1.49 | 1.65 | 3.1 | 246[5] |

TABLE 2-continued

|  | Ag | Cu | Pb | Ni/Co | Zn |
|---|---|---|---|---|---|
| Cementation step | I (2[2]) | II(2[2]) | III(2[2]) | IV(3[2]) | (electrolysis) |
| Metallic Zn added (g) | 0.05 | 75.0 | 20.0 | 6.0 | — |

[1]Weight percentage referring to the weight of cement recovered
[2]Number of phases
[3]Content of Ni and Co in the cement: 53.5% Ni; 43.4% Co
[4]Content of $Zn^{2+}$ ions measured in the solution subjected to electrolysis
[5]Amount of metallic Zn deposited at the cathode during electrolysis.

The final extraction solution was subjected to electrolysis under the same conditions indicated in Example 1, depositing 246 g of material at the cathode, having the following composition:
Pb 20 ppm,
Cu 7 ppm,
Ni 12 ppm,
Co 6 ppm,
Ag <1 ppm,
from which it derives, by difference, that the remaining zinc has a purity higher than 99.99%.

Example 3

The process of the present invention was applied to the recovery of non-ferrous metals contained in a solid matrix consisting of a primary zinc concentrate having the following composition (weight percentage):
Fe 3.12%,
Pb 2.57%,
Zn 57.94%,
Cu 0.26%,
Ni 0.05%,
Co 0.05%,
Ag 0.034%

400 g of the above primary concentrate were subjected to leaching under the same conditions indicated in Example 1, using, however, 23 l of a solution containing 200 g/l of $NH_4Cl$, 100 g/l of NaCl and 12.23 g/l of zinc.

The extraction solution has the following composition:
$Zn^{2+}$ 21.80 g/l
$Pb^{2+}$ 432 mg/l
$Cu^{2+}$ 44 mg/l
$Ni^{2+}$ 8 mg/l
$Co^{2+}$ 8 mg/l
$Ag^+$ 6 mg/l The extraction solution was treated with 4.8 g of zinc powder in two phases, obtaining 11.8 g of cement having the following composition: Pb 84.3%, Cu 8.5%, Zn 3.0%, Ni 1.6%, Co 1.5%, Ag 1.0%.

The supernatant solution contains 22.2 g/l of zinc ions, whereas the other metals have the following concentration: $Ag^+$ <1 mg/l, $Cu^{2+}$ 1.3 mg/l, $Pb^{2+}$ 1.4 mg/l, $Co^{2+}$ <1 mg/l and $Ni^{2+}$ <1 mg/l.

The supernatant solution was subjected to electrolysis under the same conditions indicated in Example 1, obtaining the electrodeposition at the cathode of 225 g of material having the following composition:
Pb 18 ppm,
Cu 10 ppm,
Ni 2 ppm,
Co 2 ppm,
Ag <1 ppm,
from which it derives, by difference, that the remaining zinc has a purity higher than 99.99%.

The invention claimed is:

1. A process for recovering non-ferrous metals from a solid matrix, the process comprising the phases of:
   (a) leaching the solid matrix with an aqueous-based solution containing chloride ions, ammonium ions, and $Cu^{2+}$ ions, and having a pH within a range of 6.5-8.5, in a presence of oxygen, at a temperature within a range of 100° C. 160° C. and a pressure within a range of 150 kPa-800 kPa, so as to obtain an extraction solution comprising leached metals and solid leaching residue;
   (b) separating the solid leaching residue from the extraction solution; and
   (c) subjecting the extraction solution to at least one cementation so as to recover the leached metals in elemental state;
   wherein the solid matrix comprises elemental sulfur and/ or metallic sulfides, and
   wherein the solid matrix further comprises iron oxides.

2. The process of claim 1, wherein the at least one cementation is effected in a plurality of cementation steps in series, obtaining from each of the steps a metallic cement, containing metal or a combination of metals, and supernatant solution which is fed to a subsequent cementation step and subjected to further cementation.

3. The process of claim 2, wherein in each of the cementation steps, precipitating metal is added in excess with respect to the metal or the combination of metals to be precipitated.

4. The process of claim 3, wherein a same precipitating metal is added in each of the cementation steps.

5. The process of claim 3, wherein in at least one of the cementation steps, the precipitating metal comprises a metallic cement obtained from a subsequent cementation step.

6. The process of claim 3, wherein the supernatant solution obtained from a last cementation step is subjected to electrolysis with recovery of the precipitating metal in elemental state and formation of a regenerated electrolytic solution.

7. The process of claim 6, wherein the regenerated electrolytic solution is used in the phase (a) as the leaching solution.

8. The process of claim 6, wherein the precipitating metal recovered by the electrolysis is used as the precipitating metal in the at least one cementation of phase (c).

9. The process of claim 3, wherein the precipitating metal is zinc in the elemental state.

10. The process of claim 2, the plurality of cementation steps comprises:
    a first cementation step in which silver (Ag) is precipitated;
    a second cementation step in which copper (Cu) is precipitated;
    a third cementation step in which lead (Pb) is precipitated; and
    a fourth cementation step in which nickel (Ni) and cobalt (Co) are precipitated together.

11. The process of claim 2, wherein the plurality of cementation steps comprises:
    a first cementation step in which a combination of silver (Ag) and copper (Cu) is precipitated; and
    a second cementation step in which a combination of lead (Pb), nickel (Ni), and cobalt (Co) is precipitated.

12. The process of claim 1, wherein the at least one cementation is a multiphase cementation which comprises:
dividing the extraction solution to be subjected to the at least one cementation into at least a first aliquot and a second aliquot;
effecting a first cementation phase by adding an excess of precipitating metal to the first aliquot, so as to precipitate a first metallic cement;
separating the first metallic cement containing the precipitating metal in excess from a first supernatant solution, and subjecting the first supernatant solution to further cementation;
effecting a second cementation phase by joining the first metallic cement to the second aliquot, so as to precipitate a second metallic cement; and
separating the first and second metallic cements from a second supernatant solution, and subjecting the second supernatant solution to cementation in the first cementation phase.

13. A process for recovering non-ferrous metals from a solid matrix, the process comprising:
leaching the solid matrix with an aqueous-based solution, in a presence of oxygen, to obtain an extraction solution comprising leached metals and solid leaching residue;
separating the solid leaching residue from the extraction solution; and
subjecting the separated extraction solution to at least one cementation to recover the leached metals in elemental state;
wherein the aqueous-based solution comprises chloride ions,
wherein the aqueous-based solution further comprises ammonium ions,
wherein the aqueous-based solution further comprises $Cu^{2+}$ ions,
wherein a pH of the aqueous-based solution is greater than or equal to 6.5 and less than or equal to 8.5,
wherein a leaching temperature is greater than or equal to 100° C. and less than or equal to 160° C.,
wherein a leaching pressure is greater than or equal to 150 kPa and less than or equal to 800 kPa,
wherein the solid matrix comprises elemental sulfur and/or metallic sulfides, and
wherein the solid matrix further comprises iron oxides.

14. The process of claim 13, wherein the leached metals comprise one or both of silver (Ag) or copper (Cu).

15. The process of claim 13, wherein the leached metals comprise one or more of lead (Pb), nickel (Ni), or cobalt (Co).

16. The process of claim 13, wherein the at least one cementation is effected in a plurality of steps, obtaining from each of the steps:
a metallic cement comprising metal or a combination of metals.

17. The process of claim 13, wherein the at least one cementation is effected in a plurality of steps, obtaining from each of the steps:
metal or a combination of metals; and
supernatant solution which is subjected to further cementation.

18. The process of claim 13, wherein the at least one cementation comprises:
a first cementation step in which silver (Ag) is precipitated;
a second cementation step in which copper (Cu) is precipitated;
a third cementation step in which lead (Pb) is precipitated; and
a fourth cementation step in which nickel (Ni) and cobalt (Co) are precipitated together.

19. The process of claim 13, wherein the at least one cementation comprises:
a first cementation step in which a combination of silver (Ag) and copper (Cu) is precipitated; and
a second cementation step in which a combination of lead (Pb), nickel (Ni), and cobalt (Co) is precipitated.

20. A process for recovering non-ferrous metals from a solid matrix, the non-ferrous metals selected from the group consisting of copper (Cu), lead (Pb), nickel (Ni), or cobalt (Co), the process comprising the phases of:
(a) leaching the solid matrix with an aqueous-based solution containing chloride ions, ammonium ions, and $Cu^{2+}$ ions, and having a pH within a range of 6.5-8.5, in a presence of oxygen, at a temperature within a range of 100° C.-160° C. and a pressure within a range of 150 kPa-800 kPa, so as to obtain an extraction solution comprising leached metals and solid leaching residue;
(b) separating the solid leaching residue from the extraction solution; and
(c) subjecting the extraction solution to at least one cementation so as to recover the leached metals in elemental state, wherein the solid matrix comprises elemental sulfur and/or metallic sulfides; and/or iron oxides.

* * * * *